United States Patent
Capps et al.

(10) Patent No.: US 6,735,691 B1
(45) Date of Patent: May 11, 2004

(54) SYSTEM AND METHOD FOR THE AUTOMATED MIGRATION OF CONFIGURATION INFORMATION

(75) Inventors: Stephen P. Capps, Seattle, WA (US); David A. Feinleib, Kirkland, WA (US); Jacob D. Swed, Seattle, WA (US); David Scott Johnson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/492,899

(22) Filed: Jan. 27, 2000

(51) Int. Cl.[7] ................................................. G06F 9/00
(52) U.S. Cl. ......................................... 713/1; 713/100
(58) Field of Search .................... 713/1, 100; 709/200, 709/203; 707/501.1, 513; 717/11

(56) References Cited

U.S. PATENT DOCUMENTS

| | | | | |
|---|---|---|---|---|
| 5,678,044 A | * | 10/1997 | Pastilha et al. | 707/104.1 |
| 5,913,040 A | * | 6/1999 | Rakavy et al. | 370/229 |
| 6,110,229 A | * | 8/2000 | Yamaguchi | 717/178 |
| 6,131,116 A | * | 10/2000 | Riggins et al. | 709/203 |
| 6,182,212 B1 | * | 1/2001 | Atkins et al. | 713/1 |
| 6,266,577 B1 | * | 7/2001 | Popp et al. | 700/245 |
| 6,339,826 B2 | * | 1/2002 | Hayes, Jr. et al. | 709/226 |
| 6,370,646 B1 | * | 4/2002 | Goodman et al. | 713/100 |
| 6,405,222 B1 | * | 6/2002 | Kunzinger et al. | 715/501.1 |

* cited by examiner

*Primary Examiner*—Thomas Lee
*Assistant Examiner*—Paul Yanchus, III
(74) *Attorney, Agent, or Firm*—Lee & Hayes, PLLC (57) ABSTRACT

A system and method for configuring a computer involves first compiling configuration information from a source computer and populating a migration file with the configuration information. The migration file is kept at a server. Subsequently, upon access to the server, the configuration information from the migration file is retrieved and used to configure a destination computer.

41 Claims, 6 Drawing Sheets

SYSTEM AND METHOD FOR THE AUTOMATED MIGRATION OF CONFIGURATION INFORMATION

TECHNICAL FIELD

This invention relates generally to computer systems and, in particular, to a system and method for automatically configuring a computer system with the configuration information of another computer.

BACKGROUND

The personal computer of today is a powerful machine that is infinitely configurable to suit the personality and tastes of the user. When first placed in service, a computer system is typically configured with default system settings (e.g., display parameters, passwords, application settings, etc.) set by the original equipment manufacturer of the computer system (hardware/software). Over time the user of the computer system will modify these default settings as well as add new applications and online services to personalize the operating environment of the computer to better suit the user's personality, tastes, mood, etc. For example, a typical user will modify the monitor background display (sometimes referred to as "wallpaper"), install a custom screen saver, install applications, modify/personalize application settings, register for and utilize online services, and the like to personalize the operating environment of the computer system. While modification of any one of these individual parameters rarely takes more than a few moments for the computer literate to accomplish, a substantial amount of time is spent in the aggregate to make all of the modifications required to personalize a computer's operating environment.

With the rapid advance of computer technology expanding the practical application of personal computers, coupled with a near-quarterly reduction in computer system prices, the life-span of computer systems has been effectively reduced, as consumers desire the newest hardware to take advantage of the newest software and services available. Those in the computing industry want to encourage this trend, increasing sales of new computers and associated software and services. A drawback associated with the purchase of a new computer system, given all of the time and effort spent to personalize the old computer system, is that no convenient method or system currently exists to transport the configuration information, e.g., system settings, passwords, application configurations, online service provider account information, and the like, from one computer to another. Consequently, the user is typically only left with the option of manually configuring the new computer system. In a computer running the Windows operating system, this task of manually configuring system parameters is eased by grouping a number of the more configurable aspects of the operating system within the "Control Panel", wherein a user can manually configure display parameters, networking parameters, passwords, etc. While this is merely a nuisance to the computer-literate, it can be a daunting task to a large segment of the computing public, who typically resort to paying for a technician to come in and configure the system settings, application parameters and the online service accounts.

Thus, a need exists for a system and method for automatically migrating configuration information from one computer to another. Just such a solution is presented below, unencumbered by the inherent limitations commonly associated with the prior art.

SUMMARY

A system and method for automatically configuring a computer system with the configuration information of another computer is presented. In accordance with one example embodiment, a method for configuring a computer comprises compiling configuration information from a source computer during an initial access and populating a migration file with the configuration information. Upon a subsequent access, a destination computer is modified to reflect the configuration information contained within the migration file. Thus, it will be appreciated that the present invention enables a user to automatically migrate configuration information from a first computer to a second computer, relieving the user of the time-consuming process of manually configuring the second computer.

According to one aspect of the invention, a migration manager comprising a mining agent and a configuration manager automatically collects configuration information from a source computer to populate a migration file and, subsequently, configure a destination computer system with the configuration information of the migration file. In one embodiment, the mining agent is downloaded to a source computer to collect system setting, application setting, online service provider account, password, and other operating parameters (i.e., configuration information) to populate the migration file. Once the information is collected on the client, the migration file is uploaded (i.e., posted) to a data source and a user registry is updated to denote the pathname to the migration file.

When the user subsequently accesses the migration manager using the destination computer, the pathname to the migration file is identified and an instance of the configuration manager is selectively invoked to configure the destination computer with the configuration information contained within the migration file.

It will be appreciated that the present invention represents a new paradigm in configuring new computer systems. That is, by automatically migrating the system settings and account information from one computer to another, with minimal user interaction, the present invention relieves the user of the time consuming manual configuration process, thereby improving the out-of-box experience for computer system users.

BRIEF DESCRIPTION OF THE DRAWINGS

The present invention is illustrated by way of example and not limitation in the figures of the accompanying drawings. For ease of explanation, and not limitation, the same numbers are used throughout the figures to reference like components and/or features.

DETAILED DESCRIPTION

Data Network System

Figure 1:
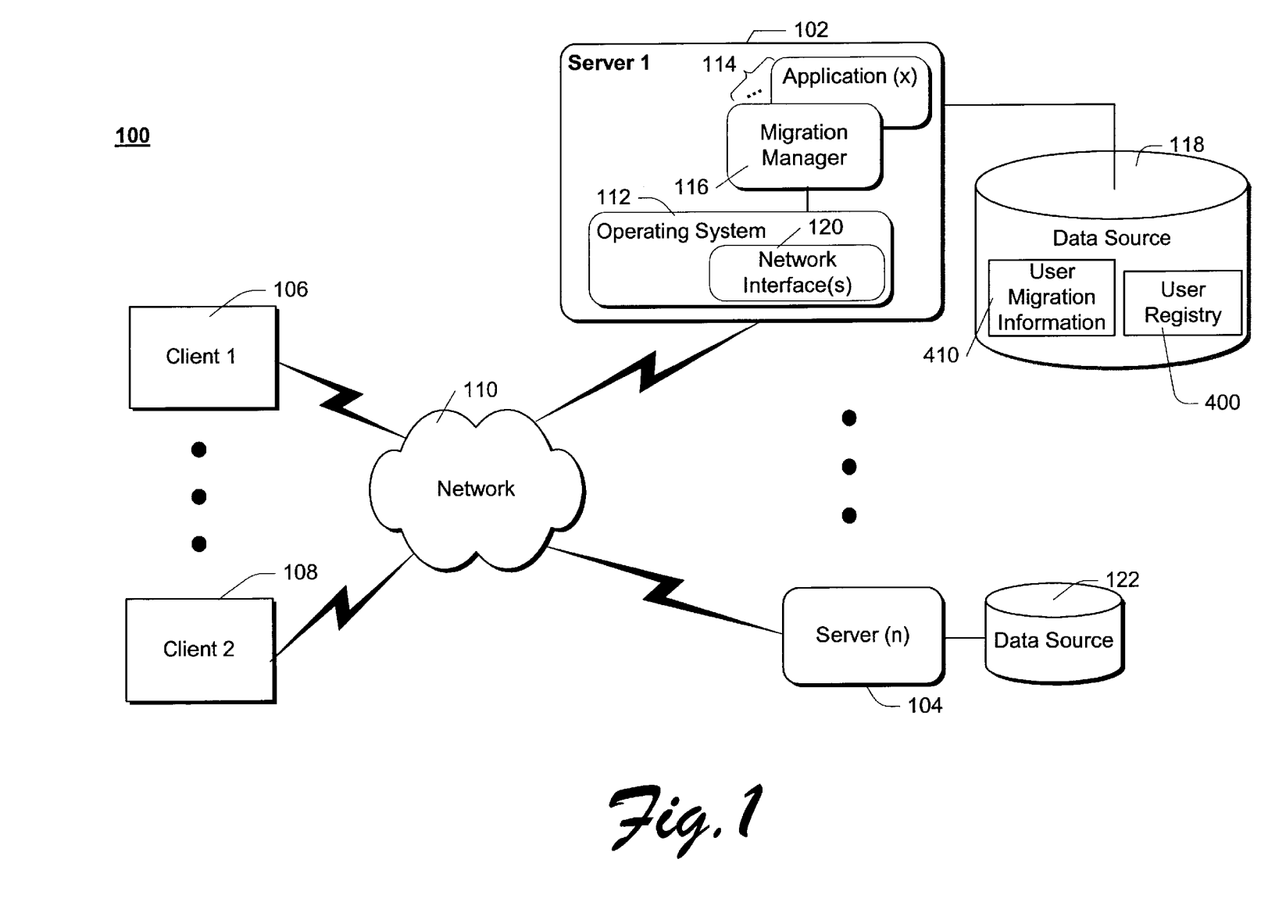
FIG. 1 illustrates a block diagram of an example client-server data network.

FIG. 1 shows an example client-server data network 100 having a plurality (n) of servers 102 and 104 coupled to one or more clients 106 and 108, respectively, via a data communications network 110. Network 110 may be implemented in a number of ways, including the Internet, a public switched telephone network (PSTN), a local area network (LAN), and a private wide area network (WAN). Communication among and between clients 106 and 108 and servers 102 and 104 can be accomplished in accordance with any of a variety of conventional communication protocols, such as the Hypertext Transfer Protocol (HTTP) or the Ethernet protocol, for example.

Server 102 runs an operating system 112 that supports a plurality (x) of applications 114, including migration manager 116 incorporating the teachings of the present invention. The operating system 112 represents a wide variety of conventional operating systems including, for example, the "Windows NT" operating system from Microsoft Corporation and a UNIX-based operating system.

The server 102 has an associated data source 118 having stored therein user migration information 400. The operating system 114 has associated network interface(s) 120 to interface the server 102 with the network 110. The network interface 120 establishes, at the request of a remote computing system (i.e., a server or a client), a communication link with the remote computing system via network 110. Examples of just such a communication link include a "dial-up connection" using a conventional modem and telephone line, a network connection established through a network proxy, etc. Once a communication link is established, network interface 120 manages the communication link according to any of a wide variety of conventional communications protocols, allowing different applications running on server 102 to communicate with client computers 106 and 108 and/or server 104.

The remaining server 104 may have a similar construction and configuration as server 102, with an associated data source 122 and network interfaces (not shown) to interface the with network 110.

Client computers 106 and 108 each individually represent a broad range of client computing platforms and information appliances including a personal computer system, a thin-client computer system, a personal digital assistant (PDA), a handheld computer system, a set-top box appliance such as WebTV, and the like. Client computers 106 and 108 run an operating system and/or a browser to communicate with server 102 to facilitate configuration of the client.

Migration manager 116, as will be developed more fully below with reference to FIG. 3, automatically collects configuration information, i.e., system setting, passwords, online service account information, and the like from a source computer to populate a migration file and, subsequently, configure a destination computer using the configuration information from the source computer. It is to be appreciated that the present invention need not utilize a dedicated migration file, but may simply add text describing the configuration information to an email message. During an initial access by the user using a source client computer, e.g., client 106, an instance of migration manager 116 is invoked. A unique identifier associated with either the user or the user's computer system (hardware and/or software) is automatically detected during the initial access, whereupon migration manager 116 compiles configuration information from the source computer to create the migration file, which is stored on data source 118 in the user migration information files 400.

Once the migration file is created, migration manager 116 updates a user registry 400 to denote the data path (e.g., address) of the migration file 400 associated with the user. Upon a subsequent access to server 102, migration manager 116 is invoked upon detecting that a migration file exists for the user (i.e., as determined from user registry 400 upon logging in to server 102 from the unique user ID), and the user is prompted as to whether they wish to configure the client, e.g., destination client 108, with the configuration information resident in the migration file 410. In this way, migration manager 116 effectively configures a destination computer (e.g., a new computer system) with select system setting and account information from a source computer (e.g., an old computer system), thereby relieving the user of the task of manually configuring the destination computer.

It should be noted that although automated migration manager 116 is depicted in the example network of FIG. 1 as a separate functional element of server 102, this is for ease of explanation only. Migration manager 116 may well be implemented on server 104, and may well be integrated with one or more of applications 114 or within operating system 112 without deviating from the spirit or scope of the present invention. Accordingly, the exemplary embodiment of FIG. 1 is to be regarded as merely illustrative of the teachings of the present invention.

Exemplary Computer System

In the discussion herein, the invention is described in the general context of computer-executable instructions, such as program modules, being executed by one or more conventional computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, personal digital assistants, multiprocessor systems, microprocessor-based or programmable consumer electronics, network PCs, minicomputers, mainframe computers, and the like. In a distributed computer environment, program modules may be located in both local and remote memory storage devices.

Figure 2:
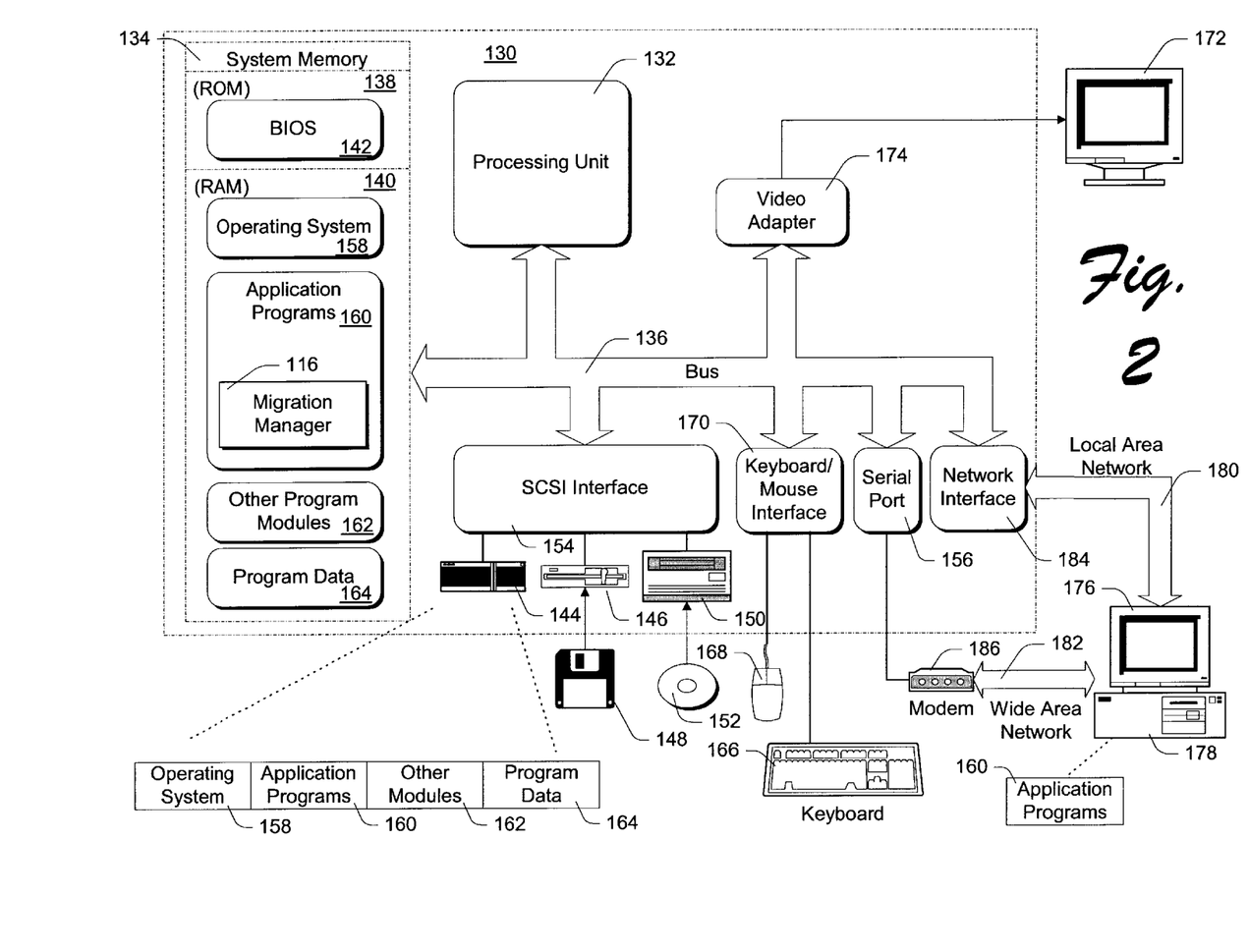
FIG. 2 illustrates a block diagram of a computer system that may be used to implement a server or a client in the client-server data network of FIG. 1.

FIG. 2 shows a general example of a computer 130 suitable for use as a server (e.g., server 102) or a client (e.g., client 106) in accordance with the invention. Computer 130 is shown as an example of a computing platform that can perform the functions of a client computer 106 or a server 102 or 104 of FIG. 1.

As shown, computer 130 includes one or more processors or processing units 132, a system memory 134, and a bus 136 that couples various system components including the system memory 134 to processors 132.

The bus 136 represents one or more of any of several types of bus structures, including a memory bus or memory controller, a peripheral bus, an accelerated graphics port, and a processor or local bus using any of a variety of bus architectures. The system memory includes read only memory (ROM) 138 and random access memory (RAM) 140. A basic input/output system (BIOS) 142, containing the basic routines that help to transfer information between elements within computer 130, such as during start-up, is stored in ROM 138. Computer 130 further includes a hard disk drive 144 for reading from and writing to a hard disk, not shown, a magnetic disk drive 146 for reading from and writing to a removable magnetic disk 148, and an optical disk drive 150 for reading from or writing to a removable optical disk 152 such as a CD ROM, DVD ROM or other such optical media. The hard disk drive 144, magnetic disk drive 146, and optical disk drive 150 are connected to the bus 136 by a SCSI interface 154 or some other suitable bus interface. The drives and their associated computer-readable media provide nonvolatile storage of computer readable instructions, data structures, program modules and other data for computer 130. Although the exemplary environment described herein employs a hard disk 144, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk 144, magnetic disk 148, optical disk 152, ROM 138, or RAM 140, including an operating system 158, one or more application programs 160 including, for example, the innovative migration manager 116, other program modules 162, and program data 164. A user may enter commands and information into computer 130 through input devices such as keyboard 166 and pointing device 168. Other input devices (not shown) may include a microphone, joystick, game pad, satellite dish, scanner, or the like. These and other input devices are connected to the processing unit 132 through an interface 170 that is coupled to bus 136. A monitor 172 or other type of display device is also connected to the bus 136 via an interface, such as a video adapter 174. In addition to the monitor 172, personal computers often include other peripheral output devices (not shown) such as speakers and printers.

As shown, computer 130 operates in a networked environment using logical connections to one or more remote computers, such as a remote computer 176. The remote computer 176 may be another personal computer, a personal digital assistant, a server, a router or other network device, a network "thin-client" PC, a peer device or other common network node, and typically includes many or all of the elements described above relative to computer 130, although only a memory storage device 178 has been illustrated in FIG. 2.

As shown, the logical connections depicted in FIG. 2 include a local area network (LAN) 180 and a wide area network (WAN) 182. Such networking environments are commonplace in offices, enterprise-wide computer networks, intranets, and the Internet. In one embodiment, remote computer 176 executes an Internet Web browser program such as the "Internet Explorer" Web browser manufactured and distributed by Microsoft Corporation of Redmond, Wash. to access and utilize online services.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the innovative steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Migration Manager

Figure 3:
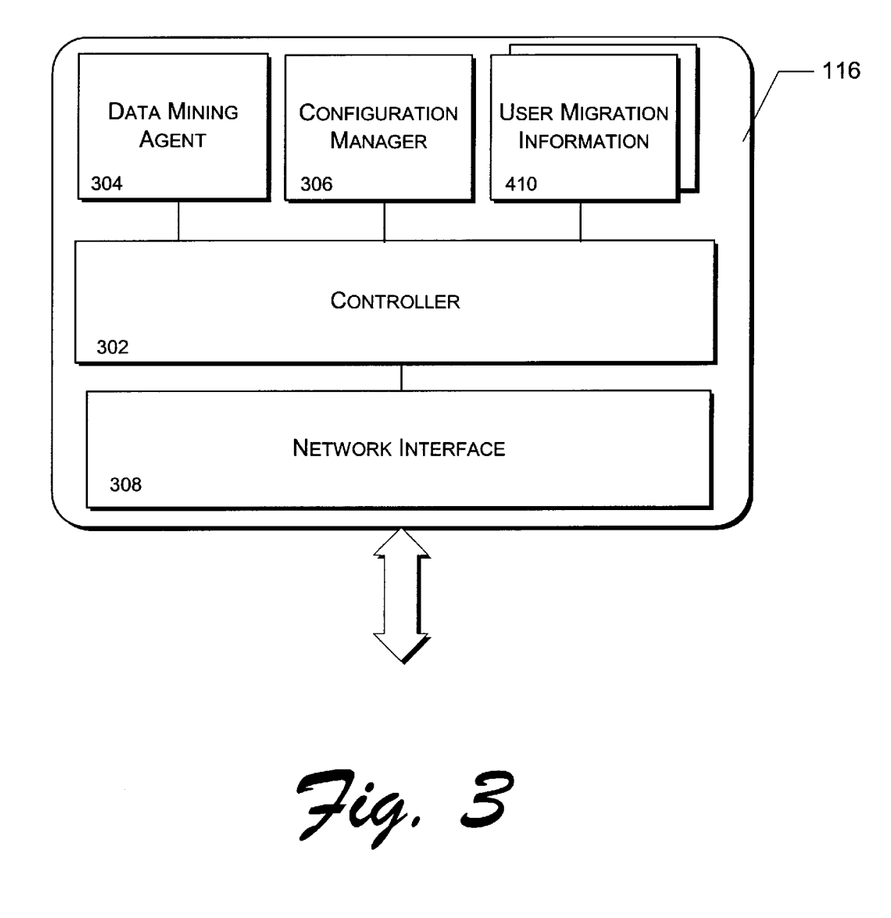
FIG. 3 illustrates a block diagram of a migration agent that automatically configures a computer system with the system settings and account information of another computer system.

FIG. 3 illustrates a block diagram of an example migration manager 116 to automatically configure a computer system with the configuration information of another computer. As shown, migration manager 116 includes controller 302, data mining agent 304, configuration manager 306, user migration files 410 and a network interface 308. For ease of explanation, each of controller 302, data mining agent 304, configuration manager 306, user migration information 410, and network interface 308 are illustrated in FIG. 3 as independent functional blocks. It is to be appreciated, however, that one or more of these functional blocks may well be combined and integrated without deviating from the spirit and scope of the present invention. Indeed, such alternate implementations are anticipated. In addition, migration manager 116 and the functional blocks illustrated within FIG. 3 may well be implemented within software or firmware.

According to one implementation of the invention, controller 302 communicates with other applications (e.g., applications 114 operating on server 102, server 104 or clients 106 and 108, respectively) to invoke and manage the services of mining agent 304 and configuration manager 306 of migration manager 116. In one implementation, for example, a user interface application executing on server 102 presents migration manager 116 as an executable service to users of server 102 (e.g., client 106). Upon initiating the migration process, controller 302 detects a unique user identifier associated with either the user or the user's client computer. Controller 302 utilizes the unique identifier to reference the migration file associated with the user. In one implementation, the unique identifier is a "passport number"

assigned to the user by an application (e.g., an online service application) or the operating system executing on the client. In one implementation, server 102 provides controller 302 with the unique identifier. If the identifier is not provided to controller 302, the controller interrogates the system resources of the client computer, e.g., client 106, to obtain the unique user identifier.

In addition to the foregoing, controller 302 also manages storage of and access to user migration information 410. Once data mining agent 304 has collected the required configuration information from a client computer, controller 302 identifies an appropriate storage location for the user migration information, and updates the server user registry 400 to reflect the pathname to the user migration information. Similarly, once configuration manager 306 has configured another computer using the migration information, controller 302 prompts the user to determine whether the user wishes to maintain the migration information to configure another computer, and updates the server registry accordingly. That is, if the user indicates that no further configurations are anticipated, controller 302 removes the user migration information from the user registry 400, and deletes the migration information from the data source. If the user wants to maintain the migration information, controller 302 simply concludes the instance of the migration manager 116. In certain anticipated implementations, controller 302 may well monitor the length of time between accesses of migration information by a user and, after a predetermined period of inactivity, prompts the user as to whether they wish to continue to maintain the migration information, updating the user registry and data source according to the user's response.

Data mining agent 304 is invoked by controller 302 upon an initial access of the migration manager 116 by a user. Data mining agent 304 interrogates the system resources of a user's client computer to compile configuration information defined by a configuration profile (not shown). As used herein, the configuration profile contains a listing of the configuration information required to complete the migration file, e.g., system settings, passwords, online service provider account information, application settings, and the like. The configuration profile may be predetermined and stored within the mining agent 304 at the time of manufacture, or dynamically created by the user upon invocation of migration manager 116. In one implementation, for example, controller 302 presents the user with a default configuration profile through a user interface (e.g., graphical user interface (GUI)) of the user's client computer, enabling the user to modify the configuration profile as they deem necessary. In an alternate implementation, mining agent 304 is invoked to compile a preliminary list of available configuration information, which is presented to the user in the configuration profile to select which information is to be stored in the migration file. In either case, controller 302 invokes an instance of data mining agent 304 to collect the configuration information defined by the configuration profile.

To collect the configuration information defined by the configuration profile, data mining agent 304 covertly accesses data stored on the client computer in well known locations associated with the particular operating system of the client, to collect the configuration information. To do so, data mining agent 304 opens select data files, e.g., system registry files, cookie files, control panel files, and the like through the client computer's operating system and copies select information from such files into the migration file created by mining agent 304 and associated with the user. To compile the information, data mining agent 304 may well be downloaded by controller 302 and executed locally on the user's client computer. According to one implementation, data mining agent 304 is an ActiveX control that is downloaded to the user's computer and invoked by controller 302. In alternate implementations, data mining agent 304 collects the information from migration manager 116 by constructing and issuing commands to collect the required information from the remote client computer via network 110. Moreover, although data mining agent 304 has been described above as an ActiveX control, other operating system-independent application language such as, for example, the Java language, HyperText Markup Language (HTML), eXtensible Markup Language (XML) and the like may well be utilized to create data mining agent 304 without deviating from the spirit and scope of the present invention.

As introduced above, once mining agent 304 has compiled the required configuration information, controller 302 identifies an appropriate storage location, e.g., data source 118 and stores the newly created migration file. In addition, controller 302 updates a user registry 400 associated with server 102 to denote that a migration file exists for an associated user.

Configuration manager 306 is invoked by controller 302 upon receiving an indication from a user to configure a computer on a subsequent access to migration manager 116 by a user. More particularly, upon invoking migration manager 116, controller 302 accesses user registry 400 and identifies the existence of a migration file associated with the user (e.g., via the unique user identifier), and prompts the user to determine whether the user wishes to configure the client computer (e.g., client 108). If so, configuration manager 306 retrieves the information resident in migration file 410 and modifies the configuration information of the client computer with the configuration information resident in migration file 410. As above, configuration manager 306 interacts with system resource files via the operating system of the client computer to modify the system setting and online service account information to mirror that of the configuration file. In one implementation, configuration manager 306 is an ActiveX control which, upon retrieving the configuration information of the migration file 410, is downloaded to the client computer via controller 302, network interface 308 and network 110.

As alluded to above, user migration information 410 is compiled by data mining agent 304 for use in configuration manager 306 to configure a new computer. In one implementation, the user migration information 410 represents a number of files of configuration information, each corresponding to a particular user of migration manager 116. It will be evident, from the discussion to follow, that user migration information 410 may well reside in any of a number of data sources including, for example, within migration manager 116 (as shown), or on remote data sources, e.g., 118 and 122.

Network interface 308 is utilized by controller 302 to access network resources such as, for example, server 104, clients 106 and 108, and data sources 118 and 122. Accordingly, inclusion of network interface 308 may, in select implementations, alleviate the need for migration manager 116 to rely on the network interface 120 of operating system 112 to communicate with network elements. That is, network interface 308 facilitates the use of migration manager 116 as a stand-alone element of data network 110.

Data Structures

As used herein, data sources 118 and 122 are each intended to represent any of a number of storage devices/ media for storing data structures. For example, data sources 118 and 122 may well be comprised of one or more of a floppy disk within a floppy disk drive, a hard disk drive, a redundant array of independent drives (RAID) system, a compact disk (CD) inserted within an accessible CD player, a digital versatile disk (DVD) inserted within an accessible DVD player, a magnetic tape within a tape drive, and the like. Such storage devices/media are well known to those skilled in the art and, thus, need not be described further.

As introduced above, user registry 400 and user migration information 410 is stored and accessible from a suitable data source, e.g., data source 118 and/or 122, by migration manager 116. One example of a data structure suitable for use as user registry 400 and user migration information file 410 is presented with reference to FIG. 4.

Figure 4:
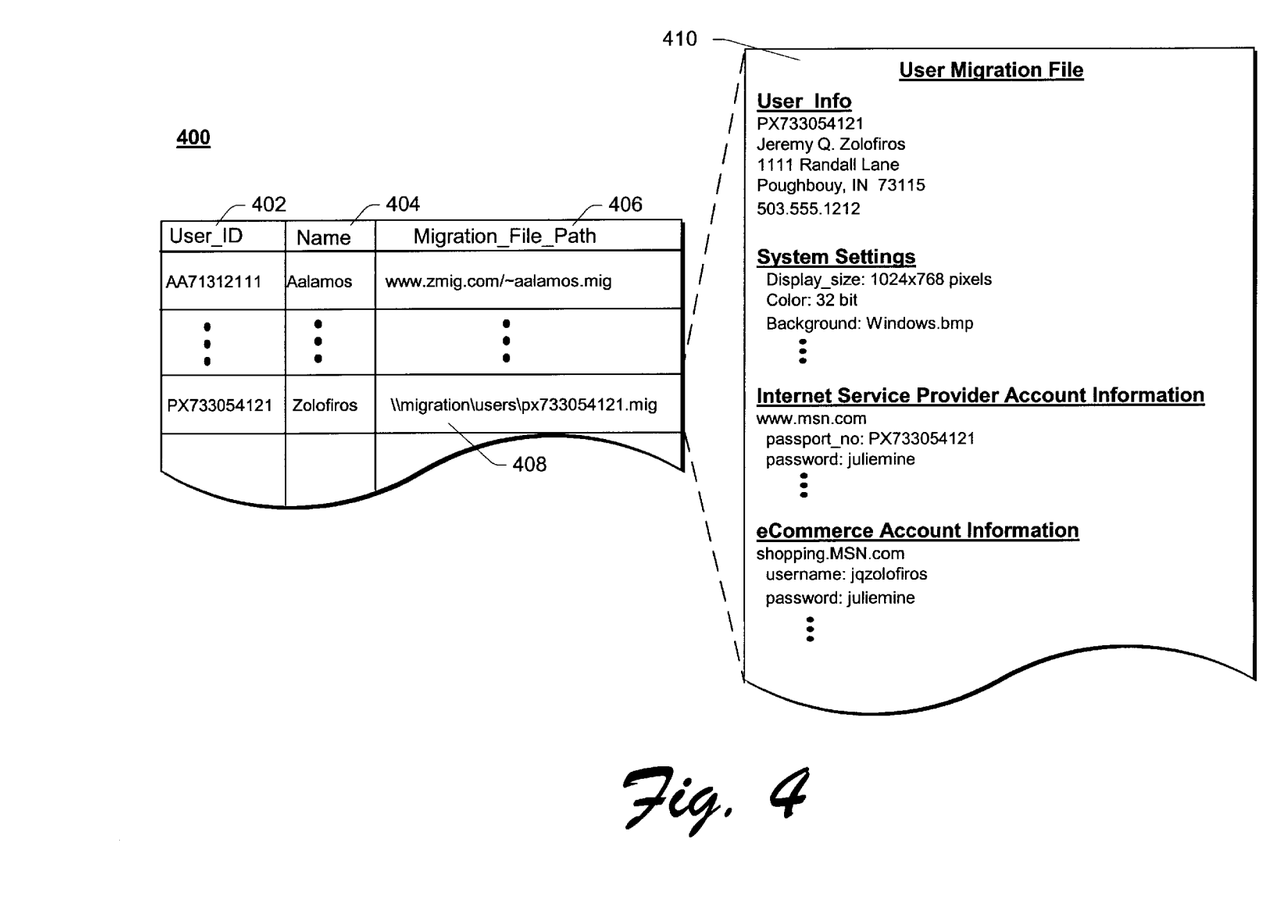
FIG. 4 graphically illustrates a data structure populated with system setting and account information used by the migration agent to automatically configure the computer system.

FIG. 4 graphically illustrates an example data structure suitable for use as user registry 400 populated with information regarding a plurality of users of server 102. User registry 400 is used by server 102 to maintain a list of registered users of the services and applications provided by server 102 including, for example, migration manager 116. As shown, user registry 400 includes a number of fields including a user_ID field 402, a name field 404 and a migration_file_path field 406. The user_ID field 402 and the name field 404 provide alternate means of accessing information stored in the user registry. That is, server 102 may well verify a user's access using information stored in either the user_ID field 402 or the name field 404. According to the invention, the migration_file_path field 406 is used to store the pathname for a migration file created for a requesting user. As introduced above, once mining agent 304 has created and populated a migration file, controller 302 identifies an appropriate storage location, e.g., data source 118, to store the file, and updates user registry 400 to include the pathname to the migration file in migration_file_path field 406. While the illustrated example depicts data files as the source of user migration information, as referenced within migration_file_path 406, those skilled in the art will appreciate that configuration information may well be stored in alternate data structures such as, for example, a database, a spreadsheet and the like without deviating from the spirit and scope of the present invention.

In addition to user registry 400, FIG. 4 depicts an example user migration file 410 referenced by migration_file_path field 408, for Mr. Jeremy Zolofiros. In accordance with the illustrated example, user migration file 410 includes user information, system setting information, Internet service provider account information, e-commerce account information, and the like obtained by mining agent 304 upon an initial invocation of migration manager 116 by a user.

Having introduced the operating environment and functional elements of the innovative migration manager 116 with reference to FIGS. 1–4, above, the operation of migration manager 116 will now be developed more fully with reference to FIGS. 5 and 6, below. For ease of explanation, the operation of the innovative migration manager will be developed in the context of an example implementation, wherein a user: Mr. Jeremy Zolofiros, a registered user of server 102, wants to transfer the configuration information, i.e., system settings, account information, passwords and the like from an old computer system, e.g., computer 106, to a new computer system, e.g., computer 108. Accordingly, the operation of migration manager 116 will be developed with continued reference to FIGS. 1–4.

Operation

Figure 5:
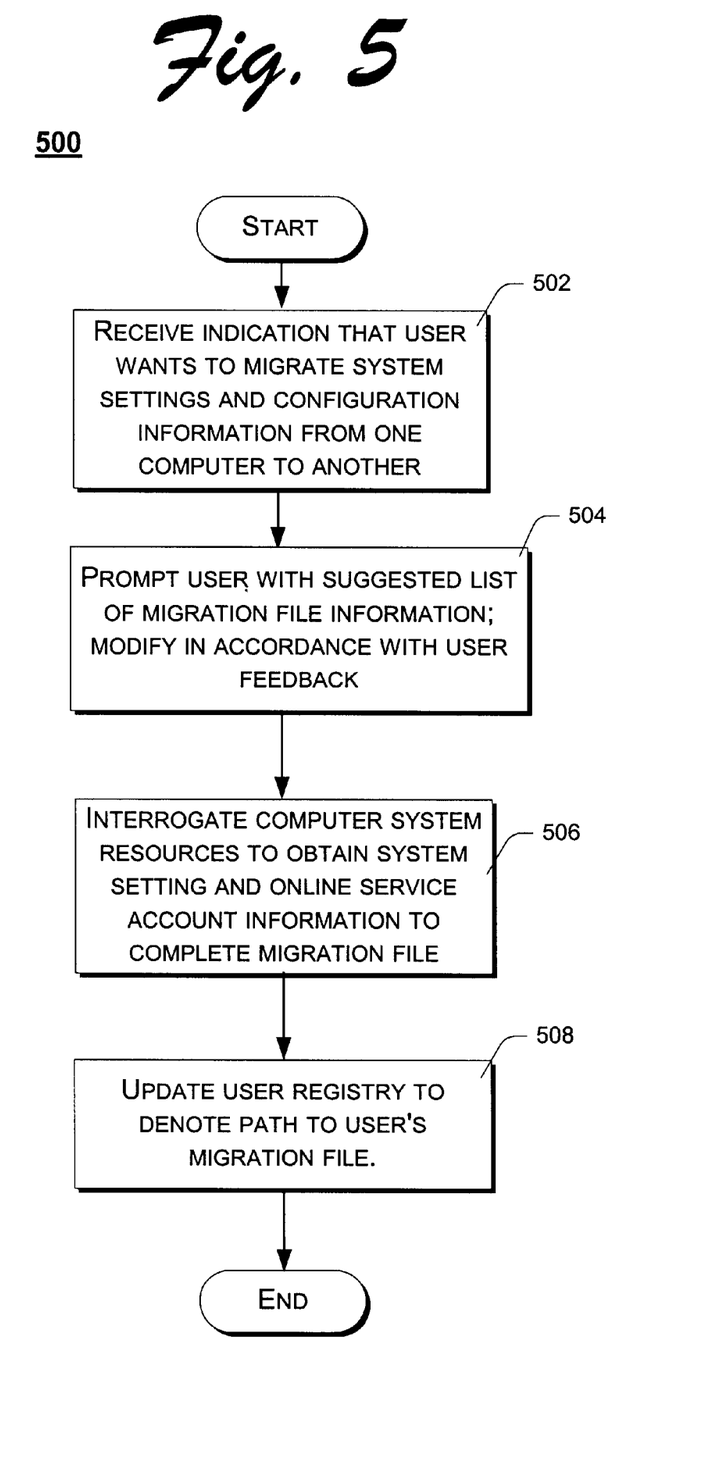
FIG. 5 illustrates a flow chart of a method of populating a migration file with system settings and account information from a computer system.

FIG. 5 illustrates a flow chart of an example method for automatically collecting and populating a data source with the configuration information from client 106 (e.g., the "old" computer), according to one embodiment of the invention. As shown, the process of FIG. 5 is implemented by a server 102 or 104 and associated data sources 118 or 122, respectively, and may well be implemented in software.

The process of migrating configuration information from one computer to another begins when a user (Mr. Zolofiros) establishes a communication link from the source computer 106 with server 102 and invokes the innovative migration manager 116, step 502. The user (Mr. Zolofiros) establishes the communication link (e.g., direct connection, HTTP, etc.) via network 110, and server 102 accesses user registry 400 to confirm that the user is a registered user using the unique user identifier (PX733054121) (i.e., account number, passport number, computer serial number, telephone number, etc.) provided by the user or the source computer 106. The indication invoking migration manager 116 is actually received by controller 302 from another application 114 executing on server 102, which provides the user interface to the user such as, for example, a web page associated with an online service, etc.

In response to receiving the indication to invoke migration manager 116, controller 302 presents the user with a default configuration profile identifying the configuration information to be collected and providing the user with the opportunity to modify the configuration profile settings, step 504. In this regard, controller 302 enables the user to select particular system settings and account information to be collected from the source computer 106 for migration to the destination computer 108. To facilitate the user's modification of the configuration profile, controller 302 provides the user at source computer 106 with a graphical user interface (GUI), which enables the user to "check" a box to select the general configuration parameters they wish to migrate.

Once the user has finalized the configuration profile, step 504, data mining agent 304 is invoked to collect the configuration information identified in the configuration profile from the source computer 106. As described above, controller 302 downloads and invokes an instance of data mining agent 304 to the source computer 106. Data mining agent 304 accesses select resources of the source computer 106 to compile the required configuration information, and stores the compiled information in a user migration file 410. Once the configuration information is collected by mining agent 304, mining agent 304 uploads the user migration file 410 to controller 302, and mining agent 304 is removed from the source computer 106.

In step 508, controller 302 identifies an appropriate storage location, e.g., a directory within data source 118, to store the user migration file 410, and updates the user registry 400 with the user migration file pathname. As shown in FIG. 4, the migration_file_path field 406 associated with Mr. Zolofiros is updated to denote a particular migration file pathname 408, referencing migration file 410. In this way, the user migration file 410 associated with the unique user ID (PX733054121) is then available upon subsequent invocations of migration manager 116 by the user (Mr. Zolofiros) to configure another computer, e.g., destination computer 108. Just such a method is presented with reference to FIG. 6.

Figure 6:
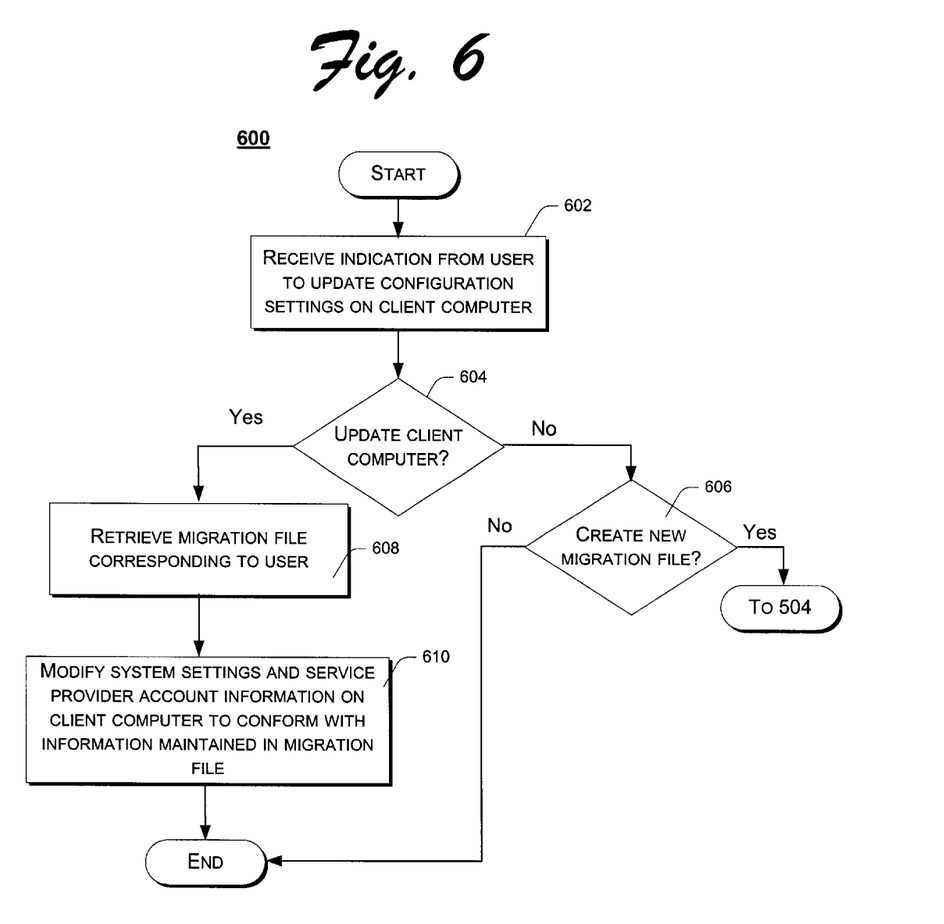
FIG. 6 illustrates a flow chart of a method for automatically configuring a computer system with the system settings and account information of the migration file.

FIG. 6 illustrates a flow chart of an example method for automatically configuring a destination computer (i.e., new computer) with the configuration information retrieved from a source computer (i.e., old computer), according to one embodiment of the present invention. As shown, the configuration process begins upon a subsequent access to server 102 by a user (e.g., Mr. Zolofiros) using the destination computer 108, and invoking an instance of migration manager 116, step 602. As above, the communication link between server 102 and the destination computer 108 is established via network 110 and associated network interface(s), and server 102 authorizes the user's access upon verifying the user's registration status with user registry 400. Similarly, as above, the indication invoking an instance of migration manager 116 is received by controller 302 from an application 114 executing on server 102, which provides controller 302 with the user's unique ID (PX733054121).

In response, controller 302 accesses the user registry 400 and determines that a migration file 410 associated with the unique user ID (PX733054121) is located at migration_file_pathname 408, and prompts the user whether they wish to configure the client computer, e.g., client 108, step 604. If the user does not wish to configure client 108, the user is prompted whether they wish to create a new migration file, step 606. If the user wants to create a new migration file, i.e., client 108 becomes the source computer, the process continues with step 504 of FIG. 5. Alternatively, the process ends.

If, in step 604, the user indicates that they do wish to proceed to configure the destination (new) computer 108 with the configuration information of the source (old) computer 106, controller 302 retrieves the migration file 410 defined by pathname 408 associated with the unique user ID of the user (PX733054121) and invokes an instance of configuration manager 306, step 608. More specifically, controller 302 downloads an instance of configuration manager 306 and user migration file 410 to the destination computer 108 to modify the destination computer settings with the information contained in the migration file, i.e., the settings from the source computer 106.

In step 610, configuration manager 306 accesses system resources of destination computer 108 and, where necessary, modifies the system settings and account information of destination computer 108 to conform with the configuration information of user migration file 410. Once the destination computer 108 has been reconfigured to reflect the configuration information in user migration file 410, the configuration manager 306 and the user migration file are removed from the destination computer 108. In select embodiments, once the destination computer 108 has been reconfigured, controller 302 deletes the migration file 410 from data source 118, and updates the user registry 400 to remove the migration_file_pathname 408 to the user migration file 410. In alternate embodiments, the migration file 410 may be maintained for a period of time, enabling the user to modify the configuration settings of yet another computer with the configuration information obtained from source computer 106.

Conclusion

As provided above, the innovative migration manager of the present invention automatically compiles a migration file with configuration information from a source computer during an initial access to a server and, upon a subsequent invocation of the manager, automatically configures another computer (i.e., a destination computer) with the information contained in the migration file. In this regard, the innovative migration manager described herein enables a user to preserve and transfer the system settings and account information resident on one computer to any of a number of other computers without having to manually program such information into the other computers.

Although the invention has been described in language specific to structural features and/or methodological steps, it is to be understood that the invention defined in the appended claims is not necessarily limited to the specific features or steps described. Accordingly, while the specific features and steps are disclosed as preferred forms of implementing the claimed invention, those skilled in the art will appreciate that the present invention can be practiced with modification and alteration within the spirit and scope of the appended claims.

What is claimed is:

1. A method for configuring a computer system comprising:
    compiling configuration information from a source computer during an initial access of a server to populate a migration file; and
    modifying configuration information of a destination computer using the configuration information from the migration file during a subsequent access of the server.

2. A method as recited in claim 1, wherein the compiling comprises:
    accessing system resources of the source computer;
    copying select information from the accessed system resources according to a configuration profile; and
    storing the migration file at the server.

3. A method as recited in claim 2, further comprising updating a user registry of the server with a pathname to the stored migration file.

4. A method as recited in claim 3, wherein the modifying comprises:
    accessing the user registry to identify the pathname to the stored migration file;
    retrieving the stored migration file to recover the configuration information stored therein; and
    replacing configuration information of the destination computer with the configuration information from the migration file.

5. A method as recited in claim 1, wherein the modifying comprises:
    accessing the contents of the migration file to recover the configuration information; and
    replacing configuration information of the destination computer with the configuration information from the migration file.

6. A method as recited in claim 1, wherein the compiling comprises:
    prompting a user at the source computer with a configuration profile defining the configuration information to be migrated to the destination computer;
    modifying the configuration profile according to the user's response; and
    collecting configuration information from the source computer according to the configuration profile.

7. A method as recited in claim 1, wherein the compiling comprises:
    accessing system resources of the source computer to collect configuration information according to a default configuration profile;
    presenting a user of the source computer with a listing of the collected configuration information;
    prompting the user to identify which configuration information to retain; and
    storing the configuration information according to the user's response.

8. A method as recited in claim 1, wherein the configuration information comprises one or more of system settings, online service account information, passwords, and electronic commerce (eCommerce) account settings.

9. A storage medium having stored thereon a plurality of instructions, which when executed, implement a method as defined in claim 1.

10. A server executing a plurality of instructions which automatically implements a method as defined in claim 1.

11. A server executing a plurality of instructions which automatically invokes a function implementing a method as defined in claim 1 on a semi-regular basis.

12. A migration manager comprising:
   a mining agent to collect configuration information from a source computer to populate a migration file, and to post the migration file to a server upon initial invocation by a user; and
   a configuration manager to retrieve the migration file from the server and modify a destination computer with the configuration information from the migration file upon subsequent invocation by the user.

13. A migration manager as recited in claim 12, wherein the mining agent is an ActiveX control downloaded to the source computer to collect the configuration information.

14. A migration manager as recited in claim 12, wherein the mining agent accesses system resources of the source computer to collect the configuration information.

15. A migration manager as recited in claim 14, wherein the mining agent accesses system resources by constructing and issuing commands to access files according to an identified operating system of the source computer.

16. A migration manager as recited in claim 12, wherein the configuration manager is an ActiveX control downloaded to the source computer with configuration information retrieved from the migration file to configure the destination computer.

17. A migration manager as recited in claim 12, wherein configuration manager accesses system resources of the destination computer to modify configuration information stored therein with configuration information from the migration file.

18. A migration manager as recited in claim 12, further comprising a controller to selectively invoke the mining agent and the configuration manager in response to an indication from a user.

19. A migration manager as recited in claim 18, wherein the controller identifies an appropriate storage location to store the migration file once populated by the mining agent.

20. A migration manager as recited in claim 19, wherein the controller updates a user registry field corresponding to the user to denote the storage location of the migration file.

21. A migration manager as recited in claim 20, wherein the controller invokes the configuration manager upon an access from a user having an associated migration file identified within the user registry.

22. A migration manager as recited in claim 18, wherein the controller invokes the mining agent upon an access from a user without an associated migration file identified within a user registry.

23. A migration manager as recited in claim 12, wherein the migration manager presents a user with a default configuration profile upon invoking the mining agent.

24. A migration manager as recited in claim 23, wherein the configuration profile is a list of the configuration information to be collected by the mining agent.

25. A migration manager as recited in claim 23, wherein the configuration profile denotes configuration information from the source computer collected by the mining agent.

26. A migration manager as recited in claim 25, wherein migration agent presents the configuration profile to the user and prompts the user to select which configuration information to stored in the migration file.

27. A storage medium having stored thereon a plurality of instructions which, when executed by a host computer, implement the migration manager of claim 12.

28. An apparatus comprising:
   a storage device having stored therein a plurality of executable instructions; and
   an execution unit, coupled to the storage device, to execute at least a subset of the plurality of instructions to implement a migration manager which, upon initial invocation by a user compiles configuration information from the user's source client computer to populate a migration file and, upon a subsequent invocation by the user modifies configuration information of a destination client computer with configuration information from the migration file.

29. An apparatus as recited in claim 28, wherein the migration manager downloads a mining agent to the source client computer to collect the configuration information.

30. An apparatus as recited in claim 29, wherein the mining agent accesses system resources of the source client computer to compile the configuration information.

31. An apparatus as recited in claim 29, wherein the mining agent is an ActiveX control.

32. An apparatus as recited in claim 28, wherein the migration manager presents the user with a configuration profile detailing the configuration information to be collected, enabling the user to modify the configuration profile.

33. An apparatus as recited in claim 32, wherein the migration manager builds the configuration profile by first accessing the source client computer and compiling a list of available configuration information.

34. An apparatus as recited in claim 28, wherein the migration manager downloads a configuration manager to configure the destination client computer with configuration information from the migration file.

35. A system comprising:
   a client computer coupled to a network;
   a server coupled to the network; and
   a migration manager implemented at the server which, upon an initial invocation by a user of the client computer, compiles configuration information from the client computer and builds a migration file and, upon a subsequent invocation by the user, configures another computer with the configuration information from the migration file.

36. A system as recited in claim 35, wherein the migration manager invokes a mining agent, which is downloaded to the client to compile the configuration information and to populate the migration file.

37. A system as recited in claim 36, wherein the mining agent accesses system resources of the client computer to compile the configuration information.

38. A system as recited in claim 36, wherein the mining agent compiles and stores configuration information from the client computer according to a configuration profile.

39. A system as recited in claim 38, wherein the migration manager presents the configuration profile to the user to select which configuration information to store in the migration file.

40. A system as recited in claim 35, wherein the migration manager invokes a configuration manager which is downloaded to and configures another client computer with configuration information from the migration file.

41. A system as recited in claim 40, wherein the configuration manager accesses system resources of another client computer and modifies those which do not conform to the configuration information from the migration file.

* * * * *

UNITED STATES PATENT AND TRADEMARK OFFICE
CERTIFICATE OF CORRECTION

PATENT NO. : 6,735,691 B1
DATED : May 11, 2004
INVENTOR(S) : Capps et al.

It is certified that error appears in the above-identified patent and that said Letters Patent is hereby corrected as shown below:

Title page,
Item [54], Title, replace "SYSTEM AND METHOD FOR THE AUTOMATED MIGRATION OF CONFIGURATION INFORMATION" with -- METHOD FOR COMPILING AND STORING CONFIGURATION INFORMATION OF A SOURCE COMPUTER WHEN INITIALLY ACCESSING A SERVER AND CONFIGURING A DESTINATION COMPUTER USING THE STORED CONFIGURATION INFORMATION --

Signed and Sealed this

Thirteenth Day of July, 2004

JON W. DUDAS
*Acting Director of the United States Patent and Trademark Office*